United States Patent [19]
Kitai et al.

[11] 4,264,177
[45] Apr. 28, 1981

[54] BLADE MECHANISM FOR USE IN A FOCAL PLANE SHUTTER

[75] Inventors: Kiyoshi Kitai, Tokyo; Eiichi Onda, Chiba; Masanori Watanaba, Narashino, all of Japan

[73] Assignee: Seiko Koki Kabushiki Kaisha, Japan

[21] Appl. No.: 677,148

[22] Filed: Apr. 15, 1976

[30] Foreign Application Priority Data

Apr. 23, 1975 [JP] Japan .................. 50/55346[U]
Apr. 23, 1975 [JP] Japan .................. 50/55347[U]

[51] Int. Cl.³ .................................................. G03B 9/36
[52] U.S. Cl. ..................................................... 354/246
[58] Field of Search ............... 354/246, 247, 249, 245, 354/250, 251, 152, 246–251

[56] References Cited

U.S. PATENT DOCUMENTS

| | | | |
|---|---|---|---|
| 3,035,502 | 5/1962 | Renner et al. | 354/233 |
| 3,628,434 | 12/1971 | Leitz et al. | 354/249 |
| 3,628,438 | 12/1971 | Loseries | 354/246 |
| 3,810,224 | 5/1974 | Kitai et al. | 354/250 |
| 3,834,802 | 9/1974 | Kitai et al. | 354/246 |
| 3,854,144 | 12/1974 | Onda et al. | 354/246 |
| 3,967,290 | 6/1976 | Waaske | 354/249 |
| 3,987,471 | 10/1976 | Adamski | 354/154 X |
| 3,988,754 | 10/1976 | Rentschler et al. | 354/246 |
| 3,999,196 | 12/1976 | Inoue | 354/246 |
| 4,024,555 | 5/1977 | Inoue | 354/249 |

*Primary Examiner*—Donald A. Griffin
*Attorney, Agent, or Firm*—Robert E. Burns; Emmanuel J. Lobato; Bruce L. Adams

[57] ABSTRACT

A focal plane shutter for a camera of the type wherein an image is viewed through the photographing lens by use of a viewfinder arranged on top of the camera body. The shutter blade mechanism comprises a group of opening blades and a group of closing blades, each group of blades consisting of a plurality of separate blades which are actuated to run in the vertical direction of the camera for exposing the film. The lower group of blades has a larger vertical dimension when in the retracted condition than the upper group of blades and such is achieved by using a different number or different size of blades in the two blade groups. In both groups, the slit-forming blades are mounted by means of a link mechanism to effect parallel running movement of the blades. The pivot shafts for mounting the slit-forming blades are disposed at a position outside of the region lying vertically below the viewfinder.

13 Claims, 5 Drawing Figures

BLADE MECHANISM FOR USE IN A FOCAL PLANE SHUTTER

BACKGROUND OF THE INVENTION

This invention relates to a blade mechanism for use in a focal plane shutter for a camera.

In general, in the so-called metal focal plane shutter mechanism which is opened and closed to varying degrees by coordinated displacement of a plurality of separate shutter blades by means of a shutter operating member, the individual shutter blades normally must be made relatively large in conformity with the wide shutter aperture opening area. This requires an increased shutter space and is disadvantageous for compact cameras. Especially, in the recently popular single lens reflex camera employing the metal focal plane shutter of the type wherein the image to be photographed is viewed through the photographing lens by use of a viewfinder arranged on top of the camera body, the shutter blades are retractable within the camera body at an upper position and are disposed directly below the viewfinder thereby limiting the vertical position of the viewfinder and thus preventing miniaturization of the camera. In other words, the bottom portion of a single lens reflex camera of this type is determined by the size of either the film chamber or the lens tube; while the top portion is defined by the position of either the pentaprism or viewfinder. The lower portion of the camera will therefore have almost constant dimensions and may be used comparatively efficiently as a space for receiving the shutter. However, one of the most important conditions for making the camera compact is to reduce the space for receiving the shutter blades which are retractable between the shutter aperture and viewfinder. This disadvantage, which is not encountered in the focal plane shutters of the type wherein the shutter curtains are forced to run sidewardly, has been the greatest disadvantage of focal plane shutters of the type wherein the separate metallic blades are forced to run in the vertical direction.

This invention intends to eliminate the foregoing disadvantages by providing a blade mechanism for use in a focal plane shutter which is suitable for compactizing the camera. This purpose is attained by efficiently using the space within the camera body to accommodate the shutter blade mechanism.

The shutter mechanism of the invention dispenses with the conventional need of employing an equal number of or similarly shaped opening blades and closing blades and instead, the group of opening blades which are retractable within the camera body at the lower position may be composed of, for example, three separate blades so as to effectively utilize the lower space defined within the camera body and thus reduce the cost of the camera.

On the other hand, the group of closing blades which are to be retractable within the camera body at the upper position may be composed of four or five small-sized blades so as to minimize the blade-receiving space defined in the camera body at the upper position so that the viewfinder may be arranged at a closer position to the shutter aperture. By these means, the invention makes it possible to provide a focal plane shutter which is suitable for use in a compact camera and presents a fully effective light-shielding property.

Furthermore, of the group of blades to be folded up or retracted within the camera body at an upper position, the blade portions which are disposed within the region defined vertically by the viewfinder may be made smaller in width along the extent of the viewfinder than the blade end portions which are not situated vertically beneath the viewfinder. As a result, it may be possible to increase the longitudinal dimension of the shifting pivot shaft for the slit-forming blades. This contributes to the stabilization of the width of the slit during an exposure operation and to the arrangement of the viewfinder at a closer position to the shutter aperture without adversely influencing the film exposure, whereby a focal plane shutter suitable for use in a more compactized camera can be obtained.

BRIEF DESCRIPTION OF THE DRAWINGS

Now the invention will be described in detail with reference to the accompanying drawings wherein.

DETAILED DESCRIPTION OF PREFERRED EMBODIMENTS

Figure 1A:
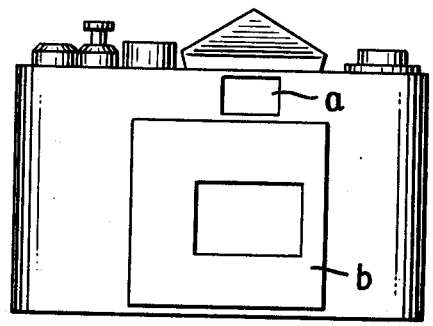
FIG. 1A is a diagrammatic view of a prior art type single lens reflex camera showing the focal plane shutter arrangement.
Figure 1B:
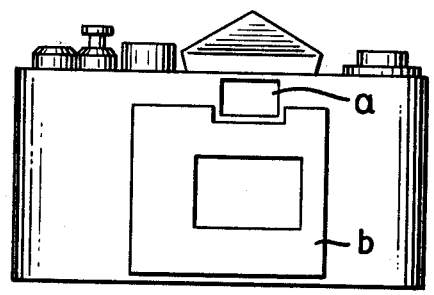
FIGS. 1B and 1C are diagrammatic views of a single lens reflex camera embodying the shutter arrangement of the invention.
Figure 1C:
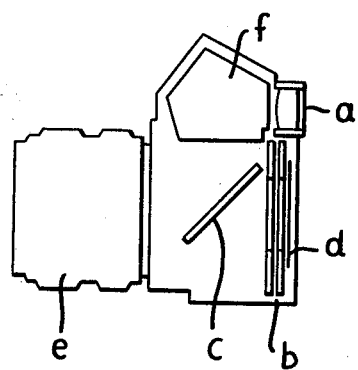

FIG. 1A illustrates a conventional shutter arrangement wherein a viewfinder a is disposed above the shutter b. FIGS. 1B and 1C illustrate the shutter of arrangement according to this invention, wherein a reflecting mirror c and a lens tube e are disposed in front of the shutter b, the film being placed behind the shutter b and a pentaprism f and a finder eye piece in the view finder a are arranged above the shutter b.

Figure 2:
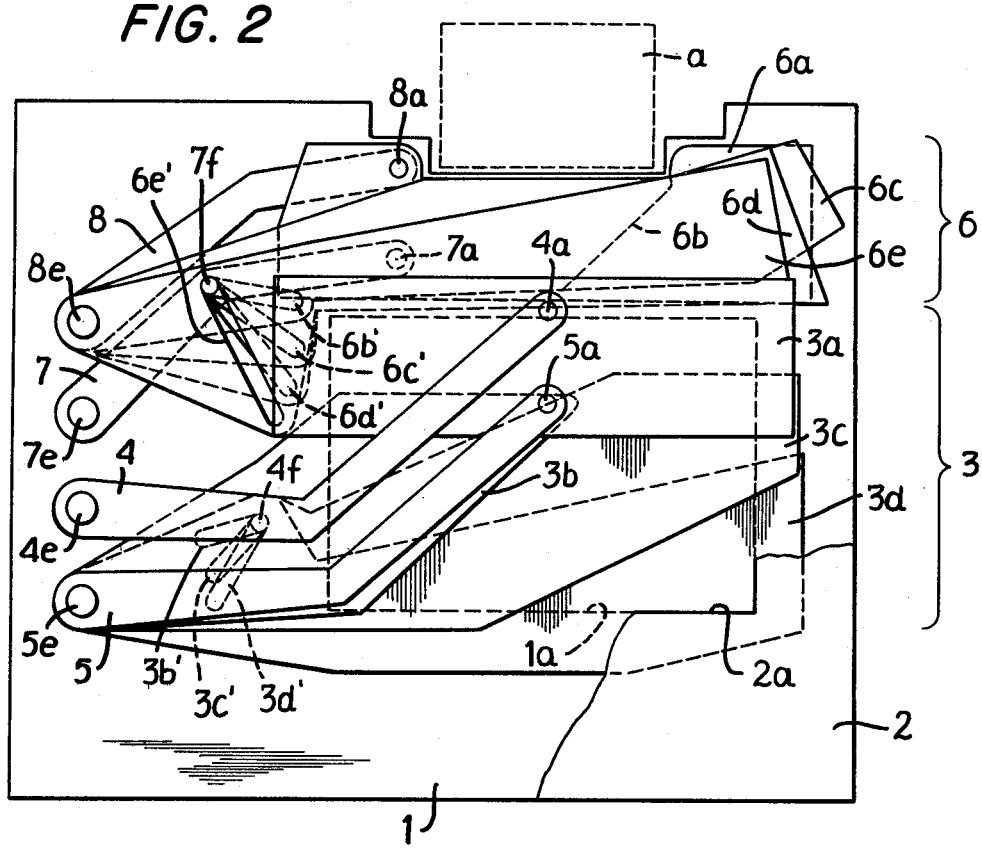
FIG. 2 is a plan view of one embodiment of shutter blade mechanism in the charged or cocked condition.

FIG. 2 is a plan view illustrating the shutter blade mechanism of this invention in the charged position. In this view, a shutter aperture 1a through which the film is exposed is formed in a base plate 1. A cover plate 2 defines an operating space for the groups of shutter blades adpated for opening and closing the aperture 1a and has a configuration almost identical with the base plate 1 and is formed with an opening 2a which has an identical size with the aperture 1a. The cover plate 2 is supported on the base plate 1 in a known manner (not shown) and for the simplicity of explanation, the cover 2 will not be further described herein in greater detail.

A group of opening blades 3 is provided for opening the aperture 1a during an exposure operation and consists of four separate blades comprising one slit-forming blade 3a and three shielding blades 3b, 3c and 3d. The slit-forming blade 3a is pivoted at pin 4a on the rear side of an opening arm 4 and at pin 5a on auxiliary opening arm 5 and both arms are rotatably pivoted on the base plate 1 at pins 4e and 5e to form a link mechanism. By utilization of the principles of a parallelogram linkage, the link mechanism serves to shift the slit-forming blade 3a in a parallel direction. The shielding blades 3b, 3c and 3d are rotatably pivoted coaxially on the shaft 5e which mounts the auxiliary opening arm 5 and a pin 4f mounted on the rear side of the center portion of the opening arm 4 engages into slots 3b', 3c' and 3d' formed in the shielding blades 3b, 3c and 3d for coordinating this movement.

A group of closing blades 6 is provided for closing the aperture 1a at the termination of an exposure operation and consists of five separate blades comprising one slit-forming blade 6a and four shielding blades 6b, 6c, 6d and 6e. In a substantially similar manner as the group of opening blades 3, the slit-forming blade 6a is pivoted on the front side of a closing arm 7 and auxiliary closing arm 8 at pins 7a and 8a, respectively. The arms 7 and 8 are rotatably pivoted on the base plate 1 at pins 7e and 8e and the pins 7a and 8a are positioned on the left side of the region vertically defined by the viewfinder a. The shielding blades 6b, 6c, 6d and 6e are rotatably and coaxially pivoted on the shaft 8e which mounts the auxiliary closing arm 8, and a pin 7f mounted on the front side of the center portion of the closing arm 7 engages into slots 6b', 6c', 6d' and 6e' formed in the shielding blades 6b, 6c, 6d and 6e.

In accordance with the invention, the group of opening blades 3 and the group of closing blades 6 are made in such sizes and/or numbers that, when in the position for opening the aperture 1a, the group of opening blades which are retractable in the lower position beneath the aperture have a larger overall or total vertical dimension than the group of closing blades which are retractable in the upper position above the aperture.

Now the operation of the shutter blade mechanism will be described. When the shutter is released in a known manner upon depression of a camera release button, the lock of the opening arm 4 (not shown) will be released and the arm 4 will start rotating clockwise by the action of spring (not shown). Thus the opening slit-forming blade 3a will be forced to run downwardly in a parallel position over the aperture 1a by means of the link mechanism, which utilizes the principles of a parallelogram linkage and, at the same time, the opening blades 3b, 3c and 3d, will rotate on the pivoting pin 5e at angles corresponding to the respective slots 3b', 3c' and 3d to their retracted state to thereby open the aperture 1a. After the group of opening blades 3 has been released and when to desired exposure time has elapsed by the operation of a known device and the lock of the closing arm 7 has been released, the closing arm 7 will start rotating clockwise by the action of a spring (not shown) and the slit-forming blade 6a will be forced to run downwardly in a parallel position over the aperture 1a by the link mechanism which utilizes the principles of a parallelogram linkage. At the same time, the shielding blades 6b, 6c, 6d and 6e will be pivoted on the pin 8e at angles corresponding to the respective slots 6b', 6c', 6d' and 6e' which are engaged with the pin 7f projected from the closing arm 7 until the closing blades reach their formed out state so as to close the aperture 1a and complete the exposure operation.

To charge the shutter, the opening arm 4 and closing arm 7 are rotated counter-clockwise in a known manner against the action of a spring (not shown) and locked in the position as shown in FIG. 2 by suitable means (not shown).

Figure 3:
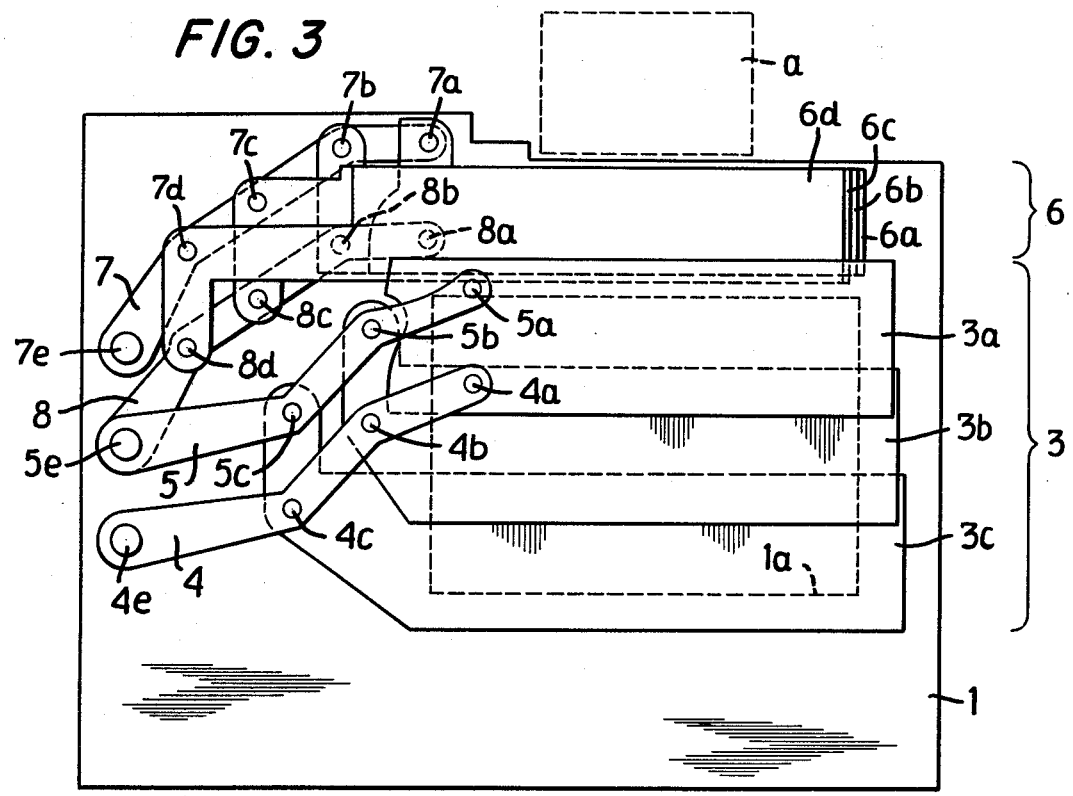
FIG. 3 is a plan view of another embodiment of shutter blade mechanism in the charged condition.

FIG. 3 is a plan view illustrating the shutter blade mechanism according to another embodiment of this invention and showing the mechanism in the shutter charged position.

In this embodiment, in contrast to the FIG. 2 embodiment, the shielding blades 3b, 3c, 6b, 6c and 6d are also mounted for pivotal movement in a manner similar to that of the slit-forming blades 3a and 6a. The shielding blades are pivoted by means of a link mechanism about pins 4c, 4d, 5c, 5d, 7c, 7d, 7e, 8c, 8d and 8e. The group of opening blades 3 is composed of three separate blades; while the group of closing blades 6 is composed of four separate blades. The auxiliary opening arm 5 and auxiliary closing arm 8 are coaxially and rotatably pivoted at pin 5a. The pivot pins 7a, 7b, 7c, 7d, 8a, 8b, 8c and 8d for the group of closing blades 6 are disposed on the left side of the region vertically limited by the viewfinder a. The group of opening blades 3 and the group of closing blades 6 are made in such sizes and/or numbers that, when situated in the position for opening the aperture 1a, the group of opening blades are retractable in the lower position beneath the aperture have larger vertical dimension or extent than the group of closing blades which are retractable in the upper position above the aperture.

The operation of the blade mechanism according to this modified embodiment is substantially equal to the blade mechanism of FIG. 2 and therefore will not again be repeated.

Although the invention has been described with reference to the embodiments wherein the groups of shutter blades are forced to run downwardly, it should be understood that the invention is not limited only to the shutter blade mechanism of this type but is equally applicable to the shutter blade mechanism wherein the groups of shutter blades are forced to run upwardly to effect an exposure operation. In this case, the blade group 6 would be the opening blades and the blade group 3 would be the closing blades and the position of the parts shown in FIGS. 2 and 3 would correspond to the state wherein the exposure has been completed. It is also apparent that the separate shutter blades and/or shielding blades are not limited only to such blades that are pivoted by use of a link mechanism or to such rotatable blades that have a fixed axis of rotation.

What is claimed is:

1. In a focal plane shutter of a camera: a shutter blade mechanism composed of a group of opening blades and a group of closing blades coacting together to open and close a shutter aperture to effect a photographic exposure, said group of opening blades for opening the shutter aperture normally disposed in a first operative position closing the shutter aperture when the shutter is in a cocked condition and operable to a second operative position opening the shutter aperture, said group of closing blades normally disposed in a first operative position opening the shutter aperture and operable to a second operative position for closing the shutter aperture to terminate the exposure, each group comprising a plurality of separate blades mounted to run in the vertical direction between retracted and fanned out states to respectively open and close the shutter aperture with one group of blades being disposed within the camera body at an upper position above the shutter aperture when in its retracted state and the other group of blades being disposed within the camera body at a lower position below the shutter aperture when in its retracted state, and wherein the group of blades retractable at the upper position above the shutter aperture has a smaller vertical dimension when in the retracted state than the group of blades retractable at the lower position below the shutter aperture.

2. A focal plane shutter according to claim 1; wherein said group of blades having a smaller vertical dimension comprises said group of closing blades.

3. A focal plane shutter according to claim 1; wherein said group of blades having a smaller vertical dimension comprises said group of opening blades.

4. A focal plane shutter according to claim 1; wherein said group of blades having a smaller vertical dimension is composed of a larger number of separate blades than the other group.

5. In a camera of the type having a focal plane shutter and having a viewfinder disposed on top of the camera body to enable viewing of an image to be photographed through the photographing lens by means of the viewfinder: a shutter blade mechanism composed of a group of opening blades and a group of closing blades coacting together to open and close a shutter aperture to effect a photographic exposure, said group of opening blades for opening the shutter aperture normally disposed in a first operative position closing the shutter aperture when the shutter is in a cocked condition and operable to a second operative position opening the shutter aperture, said group of closing blades normally disposed in a first operative position opening the shutter aperture and operable to a second operative position for closing the shutter aperture to terminate the exposure, each of said blade groups comprising a plurality of separate blades including a slit-forming blade mounted to run in the vertical direction between retracted and fanned out states to respectively open and close the shutter aperture with one group of blades being disposed within the camera body at an upper position above the shutter aperture when in its retracted state and the other group of blades being disposed within the camera body at a lower position below the shutter aperture when in its retracted state, means mounting said slit-forming blades for movement in directions parallel to each other including means mounting the slit-forming blade of the blade group which is retractable at the upper position above the shutter aperture for pivotal movement about a set of pins disposed outside of the region lying vertically below said viewfinder, and wherein at least one of the blades of the blade group retractable at said upper position above the shutter aperture comprises an end portion located outside the region lying vertically below said viewfinder, and a remaining portion having a width along the extent of said region smaller than that of said end portion and smaller than the space between said viewfinder and shutter aperture.

6. A camera according to claim 5; wherein said at least one of the blades comprises said slit-forming blade.

7. A camera according to claim 6; wherein said slit-forming blade is mounted at its end portion for pivtal movement about said set of pins.

8. A camera according to claim 5; wherein the group of blades retractable at said upper position above the shutter aperture has a small vertical dimension when in the retracted state than the other group of blades retractable at said lower position below the shutter aperture.

9. A camera according to claim 5; wherein the group of blades retractable at said upper position above the shutter aperture is composed of a larger number of blades than the other group.

10. A camera according to claim 5; wherein said group of blades retractable at said upper position above the shutter aperture comprises said group of closing blades.

11. In a camera of the type having a focal plane shutter and having a viewfinder disposed on top of the camera body to enable viewing of an image to be photographed through the photographing lens by means of the viewfinder: a shutter blade mechanism composed of a group of opening blades and a group of closing blades coacting together to open and close a shutter aperture to effect a photographic exposure, said group of opening blades for opening the shutter aperture normally disposed in a first operative position closing the shutter aperture when the shutter is in a cocked condition and operable to a second operative position opening the shutter aperture, said group of closing blades normally disposed in a first operative position opening the shutter aperture and operable to a second operative position for closing the shutter aperture to terminate the exposure, each of said blade groups comprising a plurality of separate blades including a slit-forming blade mounted to run in the vertical direction between retracted and fanned out states to respectively open and close the shutter aperture with one group of blades being disposed within the camera body at an upper position above the shutter aperture when in its retracted state and the other group of blades being disposed within the camera body at a lower position below the shutter aperture when in its retracted state, and means mounting said slit-forming blades for movement in directions parallel to each other, said means mounting each of said slit-forming blades comprising a link mechanism comprised of a pair of arms mounted for pivotal movement at one end and having the slit-forming blade pivotably mounted at the other end.

12. A shutter blade assembly for focal plane shutters comprising a shutter plate having an exposure aperture therein, a finder device arranged on the shutter plate in spaced relationship with the upper edge of said aperture, a pair of arms each respectively pivoted at one of its ends to spaced locations on said shutter plate at one side of the exposure aperture, and a shutter blade for forming an exposure slit, said blade comprising an end edge portion and a remaining portion having a width which is smaller than the edge portion and less than the space between the finder device and the upper edge of the aperture, said edge portion of the shutter blade being pivotally connected at separate points to the other ends of said arms, the edge portion being positioned proximate said one side of the exposure aperture whereby when the shutter blade is positioned such that said remaining portion occupies the space between the finder and the upper edge of the aperture, the end edge portion is disposed to one side of the finder device.

13. A shutter blade assembly as set forth in claim 12, wherein the shutter blade further comprises a plurality of auxiliary blades each having substantially the same shape as the first-mentioned blade and each being pivotally connected at its respective end edge portion to said arms at spaced intervals between the ends of the arms.

* * * * *